(12) United States Patent
Miyasaka

(10) Patent No.: US 8,156,818 B2
(45) Date of Patent: Apr. 17, 2012

(54) BOURDON TUBE PRESSURE GAUGE

(75) Inventor: Teruaki Miyasaka, Nagano (JP)

(73) Assignee: Fuji Burudon Mfg. Co., Ltd. (JP)

( * ) Notice: Subject to any disclaimer, the term of this patent is extended or adjusted under 35 U.S.C. 154(b) by 316 days.

(21) Appl. No.: 12/635,183

(22) Filed: Dec. 10, 2009

(65) Prior Publication Data

US 2010/0180689 A1    Jul. 22, 2010

(30) Foreign Application Priority Data

Jan. 16, 2009  (JP) ................................. 2009-007142

(51) Int. Cl.
*G01L 7/04* (2006.01)

(52) U.S. Cl. ........................................... 73/741; 73/732

(58) Field of Classification Search .................. None
See application file for complete search history.

(56) References Cited

U.S. PATENT DOCUMENTS

| | | | | |
|---|---|---|---|---|
| 3,937,088 A * | 2/1976 | Stradella et al. | ................ | 73/741 |
| 4,773,271 A * | 9/1988 | Mutou et al. | .................... | 73/741 |
| 5,581,029 A * | 12/1996 | Wahl et al. | ...................... | 73/741 |
| 5,591,918 A * | 1/1997 | Ferguson | ........................ | 73/732 |
| 6,119,525 A * | 9/2000 | Hamma | .......................... | 73/739 |
| 6,216,541 B1 * | 4/2001 | Carpenter | ...................... | 73/741 |
| 6,295,876 B1 * | 10/2001 | Busch | ............................. | 73/740 |
| 6,530,281 B2 * | 3/2003 | Chou | .............................. | 73/733 |
| 6,651,507 B1 * | 11/2003 | Hamma et al. | .................. | 73/741 |
| 6,681,636 B2 * | 1/2004 | Ewers et al. | ..................... | 73/707 |
| 6,684,712 B2 * | 2/2004 | Klein et al. | ..................... | 73/732 |
| 7,140,257 B2 * | 11/2006 | Henson et al. | .................. | 73/735 |
| 7,228,743 B2 * | 6/2007 | Weiss | ............................. | 73/732 |
| 7,503,222 B1 * | 3/2009 | Bessette | ......................... | 73/740 |
| 7,555,959 B2 * | 7/2009 | Miyasaka | ....................... | 73/732 |

FOREIGN PATENT DOCUMENTS

JP    2008-196893    8/2008

* cited by examiner

*Primary Examiner* — Lisa Caputo
*Assistant Examiner* — Jermaine Jenkins
(74) *Attorney, Agent, or Firm* — Harness, Dickey & Pierce, P.L.C.

(57) ABSTRACT

A bourdon tube pressure gauge includes a joint which is made of resin and attached to a pressure container, and a bourdon tube which is made of metal and provided with a base end part fixed to the joint. The joint is formed with a fixing hole to which the base end part of the bourdon tube is inserted and adhesively fixed, and a side face of the fixing hole is formed with a recessed part which is recessed in a flattened direction of the base end part of the bourdon tube that is inserted into the fixing hole. Further, the recessed part is formed toward a depth side of the fixing hole and at least a part of the recessed part which is formed on an inner side of the fixing hole is formed wider in the flattened direction than an opening part of the fixing hole which is an insertion port of the bourdon tube.

10 Claims, 8 Drawing Sheets

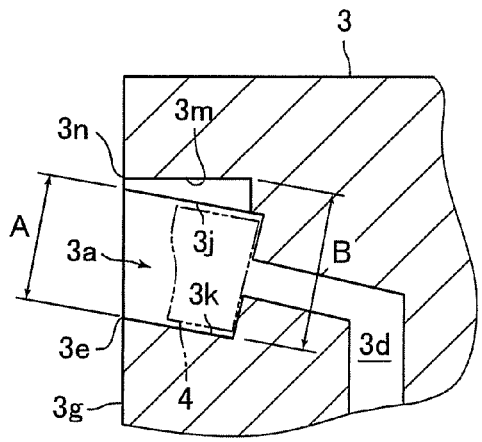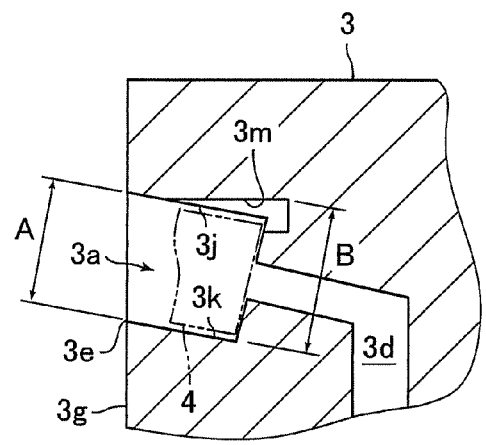
Fig.5A　　　　　　　　　Fig.5B
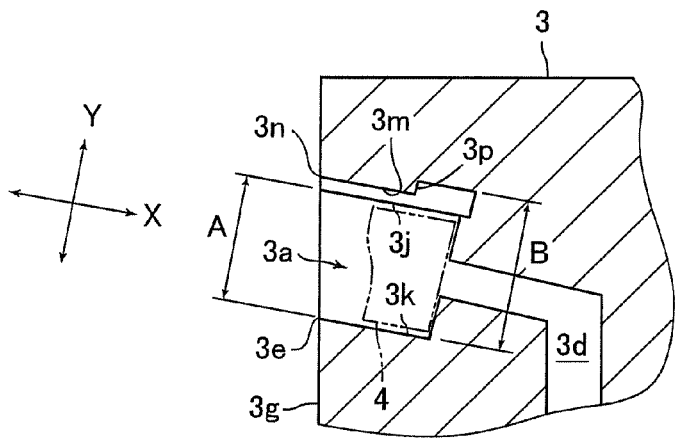
Fig.5C
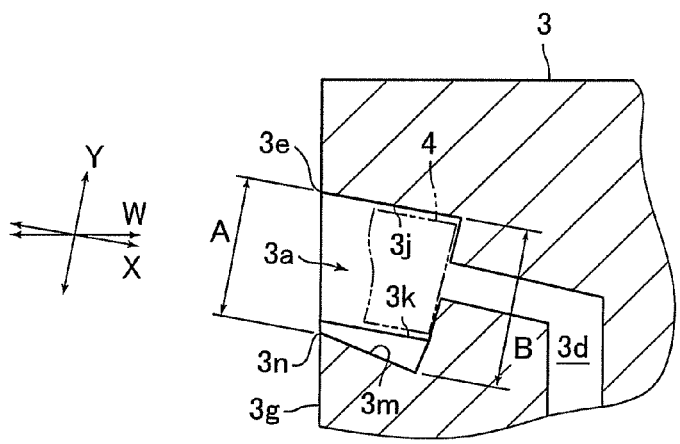
Fig.5D

BOURDON TUBE PRESSURE GAUGE

CROSS-REFERENCE TO RELATED APPLICATION

This application claims priority to Japanese Application No. 2009-7142 filed Jan. 16, 2009, the entire disclosures of which is hereby incorporated by reference.

FIELD OF THE INVENTION

The present invention relates to a bourdon tube pressure gauge.

BACKGROUND OF THE INVENTION

As a pressure gauge for measuring an internal pressure in a pressure container and the like, a bourdon tube pressure gauge utilizing a bourdon tube has been conventionally known (refer to Japanese Patent Laid-Open No. 2008-196893, for example). A bourdon tube pressure gauge described in the Patent Reference includes a bourdon tube and a joint to which a base end part of the bourdon tube is fixed. In the bourdon tube pressure gauge, the bourdon tube and the joint are made of metal material such as copper based metal or steel. Further, in the bourdon tube pressure gauge, in order to fix the base end part of the bourdon tube to the joint, the base end part of the bourdon tube is inserted and brazed to a fitting hole which is formed in the joint.

In recent years, a need for reduction in cost of the bourdon tube pressure gauge has been increasing in the market. When resin is used as material for the joint, cost of the bourdon tube pressure gauge is capable of being reduced. However, the bourdon tube made of metal cannot be fixed to the joint which is made of resin by brazing and thus fixing strength of the bourdon tube to the joint may be lowered. Therefore, when a pressure is generated in the inside of the bourdon tube, the base end part of the bourdon tube may be detached from the fitting hole of the joint.

SUMMARY OF THE INVENTION

In view of the problem described above, an objective of the present invention is to provide a bourdon tube pressure gauge which is capable of preventing a bourdon tube, which is made of metal and fixed to the joint made of resin, from detaching from the joint.

In order to attain the above-mentioned objective, the present invention provides a bourdon tube pressure gauge including a joint which is made of resin and attached to a pressure container, and a bourdon tube which is made of metal and provided with a base end part that is fixed to the joint. The joint is formed with a fixing hole to which the base end part of the bourdon tube is inserted and adhesively fixed, and a side face of the fixing hole is formed with a recessed part which is recessed in a flattened direction of the base end part of the bourdon tube that is inserted into the fixing hole. The recessed part is formed toward a depth side of the fixing hole and at least a part of the recessed part on an inner side of the fixing hole is formed wider in the flattened direction than an opening part of the fixing hole which is an insertion port of the bourdon tube.

In the bourdon tube pressure gauge in accordance with the embodiment of the present invention, the base end part of the bourdon tube which is made of metal is inserted and adhesively fixed to the fixing hole which is formed in the joint made of resin. Further, a side face of the fixing hole is formed with a recessed part which is recessed in a flattened direction of the base end part of the bourdon tube that is inserted into the fixing hole. Therefore, the recessed part can be used as a pool part for an adhesive for adhesively fixing the base end part of the bourdon tube to the fixing hole. Further, the recessed part is formed toward a depth side of the fixing hole and at least a part of the recessed part on an inner side of the fixing hole is formed wider in the flattened direction than an opening part of the fixing hole which is an insertion port of the bourdon tube. Therefore, since the recessed part is used as a pool part for an adhesive (as an adhesive pool part), even when a pressure is generated in the inside of the bourdon tube and a load is applied to the bourdon tube in a detaching direction from the fixing hole, the adhesive cured in the adhesive pool part is caught by the recessed part and prevented from peeling off from the recessed part. Accordingly, even when a load is occurred in the bourdon tube in the detaching direction from the fixing hole, the bourdon tube is capable of being prevented from detaching from the fixing hole as long as the adhesive is not peeled off from the surface of the bourdon tube. In other words, in accordance with the present invention, the bourdon tube made of metal is capable of being prevented from detaching from the joint made of resin.

Further, in accordance with the embodiment of the present invention, the recessed part which is formed toward the depth side of the fixing hole is capable of being used as the adhesive pool part. Therefore, in a direction perpendicular to the insertion direction of the bourdon tube to the fixing hole and to the flattened direction, displacement of the bourdon tube with respect to the fixing hole is capable of being prevented.

As described above, in the bourdon tube pressure gauge in accordance with the present invention, the metal bourdon tube which is fixed to the resin joint is capable of being prevented from detaching from the joint.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 3(A) is a view showing the joint which is viewed in the "F-F" direction in FIG. 1 and FIG. 3(B) is its cross-sectional view which is viewed in the "G-G" direction in FIG. 3(A).

FIGS. 5(A) through 5(D) are explanatory cross-sectional views showing structures of recessed parts in accordance with other embodiments of the present invention.

DETAILED DESCRIPTION OF THE PREFERRED EMBODIMENTS

Embodiments of the present invention will be described below with reference to the accompanying drawings.

Schematic Structure of Bourdon Tube Pressure Gauge

Figure 1:
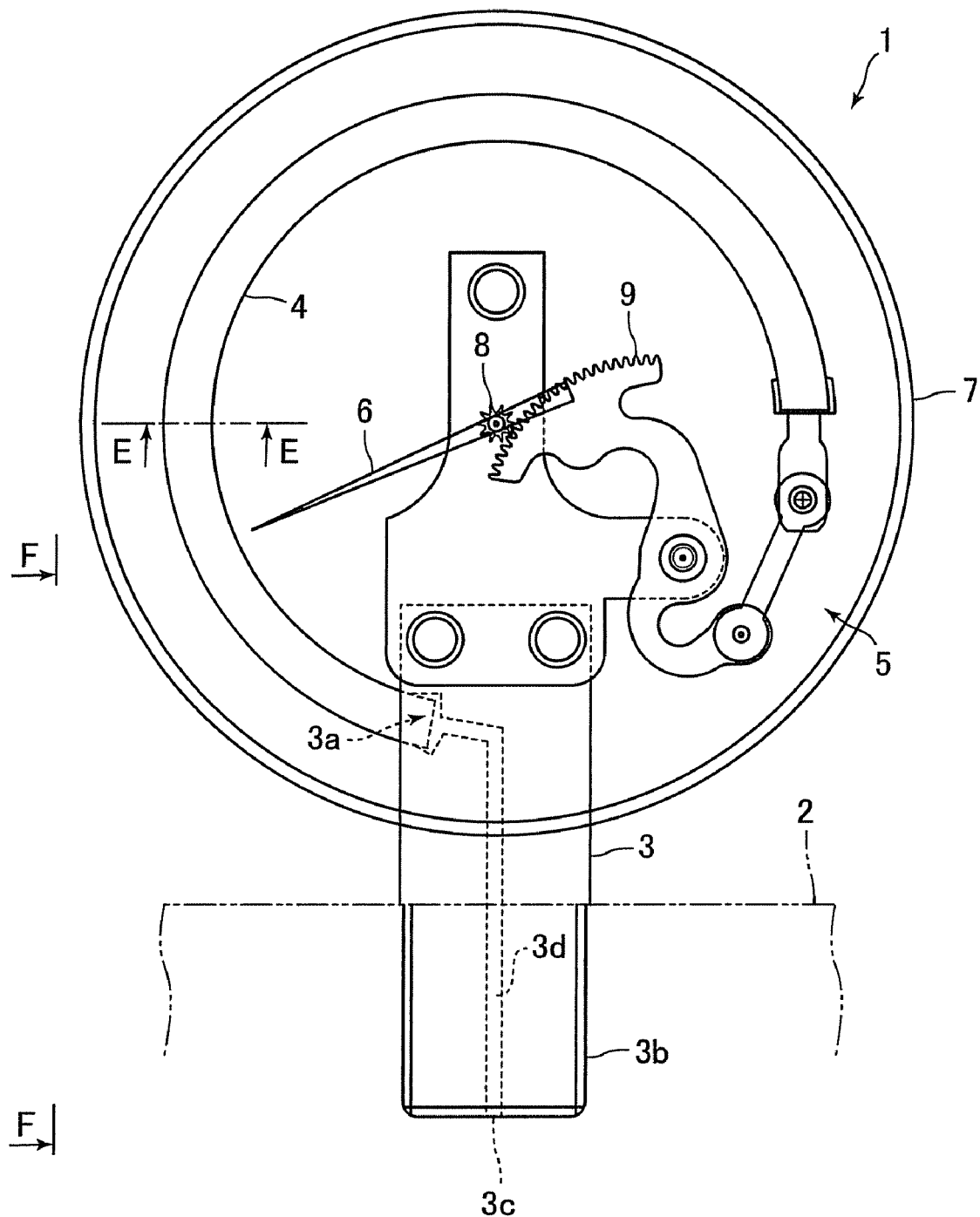
FIG. 1 is an explanatory front view showing a schematic structure of a bourdon tube pressure gauge in accordance with an embodiment of the present invention.
Figure 2:
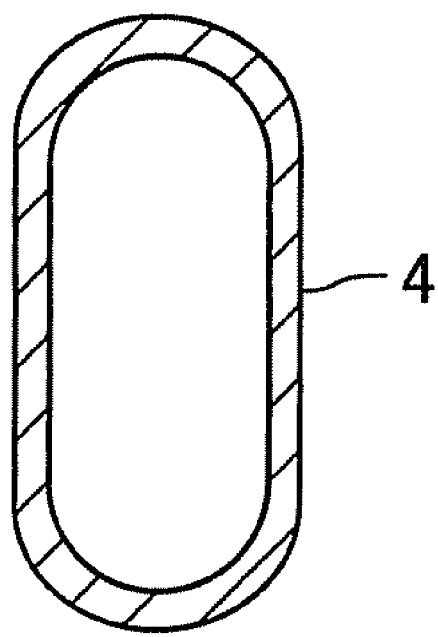
FIG. 2 is a cross-sectional view showing a bourdon tube which is out along the line "E-E" in FIG. 1.

FIG. 1 is an explanatory front view showing a schematic structure of a bourdon tube pressure gauge 1 in accordance with an embodiment of the present invention. FIG. 2 is a cross-sectional view showing a bourdon tube 4 which is cut along the line "E-E" in FIG. 1.

A bourdon tube pressure gauge 1 in this embodiment is an apparatus for measuring an internal pressure of a pressure container 2 such as a compressor or a tank. As shown in FIG. 1, the bourdon tube pressure gauge 1 includes a joint 3 which is attached to the pressure container 2 and a bourdon tube 4 whose base end part is fixed to the joint 3. A tip end part of the bourdon tube 4 is connected to a pointer 6 through a displacement enlarging mechanism 5. Further, a part of the joint 3, the bourdon tube 4, the displacement enlarging mechanism 5, the pointer 6 and the like are disposed in an inside of a case 7 which is formed in a bottomed cylindrical shape. In this embodiment, as shown in FIG. 1, the joint 3 is directly fixed to the pressure container 2. However, the joint 3 may be attached to the pressure container 2 through a pipe or the like.

The bourdon tube 4 is a metal tube which is formed of metal such as copper based metal or steel. The bourdon tube 4 has an opened base end part and a closed tip end part. Further, as shown in FIG. 2, the bourdon tube 4 is formed in a flattened shape which is squeezed or flattened in a predetermined direction. For example, the bourdon tube 4 is formed so as to have a cross-sectional shape like a flattened athletic track which is formed of two parallel straight portions and two semicircular portions. Further, the bourdon tube 4 in this embodiment is formed so as to have a substantially "C"-shape when viewed from the front side. In accordance with an embodiment of the present invention, the bourdon tube 4 may be formed so as to have an elliptical cross-sectional shape. Further, the entire of the bourdon tube 4 may be formed in a spiral or helical shape.

The pointer 6 turns along a scale on a scale plate (not shown). A pinion 8 is fixed to a turning shaft which is a turning center of the pointer 6. The displacement enlarging mechanism 5 has a function for enlarging a displacement amount of the tip end part of the bourdon tube 4 to transmit the displacement amount to the pointer 6. The tip end part of the bourdon tube 4 is fixed to an input portion of the displacement enlarging mechanism 5. Further, an output portion of the displacement enlarging mechanism 5 is provided with a sector gear 9 which is engaged with the pinion 8.

As described above, the base end part of the bourdon tube 4 is fixed to the joint 3. Specifically, the base end part of the bourdon tube 4 is fixed to the joint 3 by adhesion. Structure of the joint 3 and fixing structure of the bourdon tube 4 to the joint 3 will be described below.

Structure of Joint and Fixing Structure of Bourdon Tube

Figure 3A:
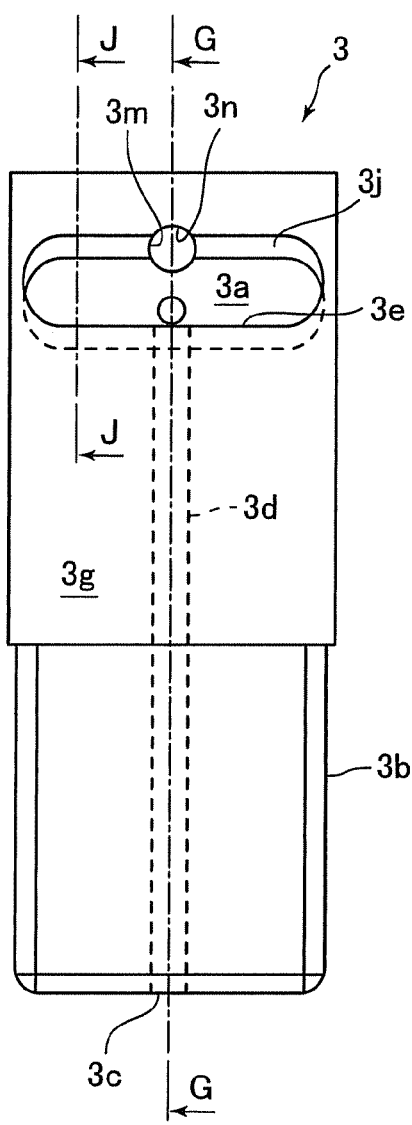
FIGS. 3(A) and 3(B) are views showing a joint in FIG. 1.
Figure 3B:
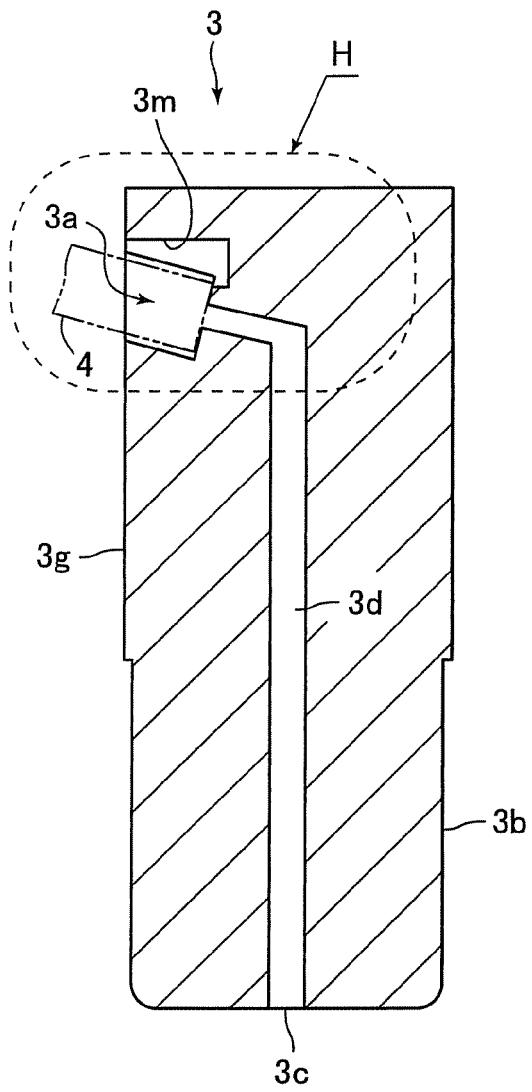
Figure 4A:
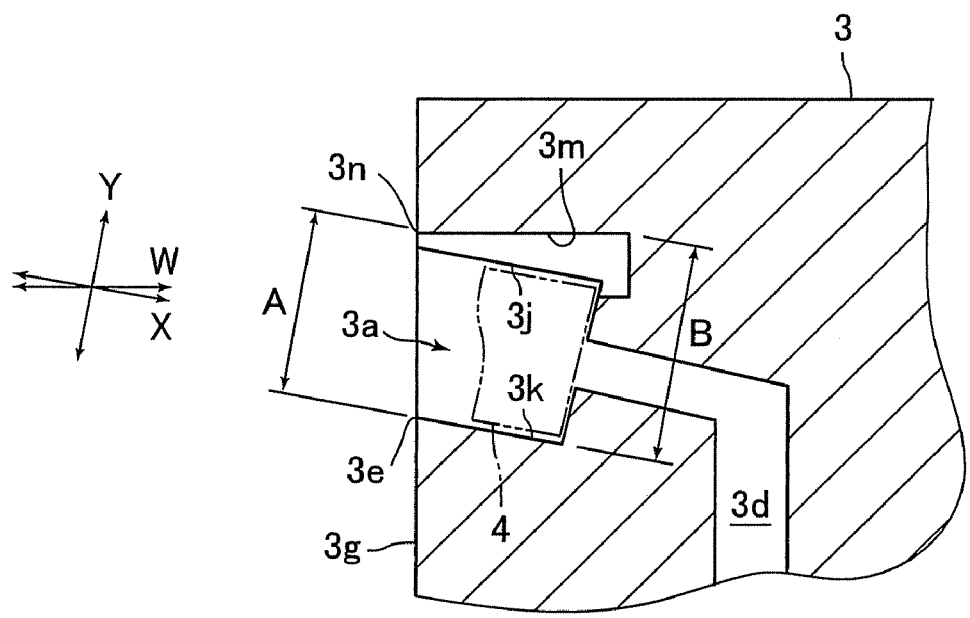
FIG. 4(A) is an enlarged cross-sectional view showing an "H" part of the joint in FIG. 3(B) and FIG. 4(B) is a cross-sectional view showing a portion of the joint which is viewed in the "J-J" direction in FIG. 3(A).
Figure 4B:
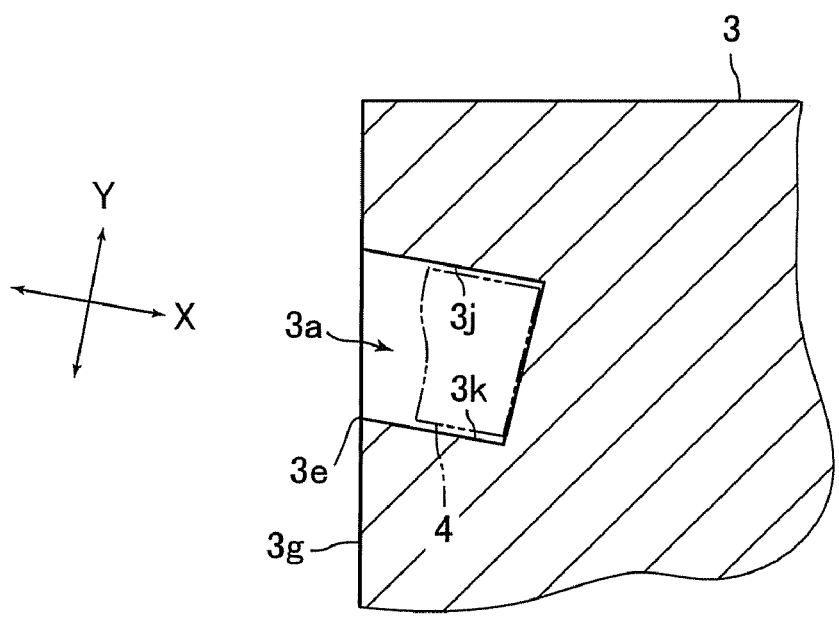

FIGS. 3(A) and 3(B) are views showing the joint 3 in FIG. 1. FIG. 3(A) is a view showing the joint 3 which is viewed in the "F-F" direction in FIG. 1 and FIG. 3(B) is its cross-sectional view which is viewed in the "G-G" direction in FIG. 3(A). FIG. 4(A) is an enlarged cross-sectional view showing an "H" part of the joint 3 in FIG. 3(B) and FIG. 4(B) is a cross-sectional view showing a portion of the joint 3 which is viewed in the "J-J" direction in FIG. 3(A). In the following descriptions, an upper side in FIGS. 3(A) and 3(B) is referred to as "upper" and a lower side in FIGS. 3(A) and 3(B) is referred to as "lower" for convenience.

The joint 3 is formed of resin. An upper end side of the joint 3 is formed in a substantially quadratic prism shape and a lower end side of the joint 3 is formed in a substantially cylindrical shape. An outer side face 3g on the upper end side of the joint 3 (side face on the front side of paper face in FIG. 3(A)) is formed with a fixing hole 3a into which the base end part of the bourdon tube 4 is inserted and adhesively fixed. An outer peripheral face on the lower end side of the joint 3 is formed with a male screw part 3b for attaching the joint 3 to a pressure container 2 and an under face of the joint 3 is formed with a pressure introduction port 3c for introducing a fluid in the pressure container 2 into the bourdon tube 4.

A pressure introduction path 3d is formed in the inside of the joint 3 for guiding the fluid introduced from the pressure introduction port 3c to the bourdon tube 4. The pressure introduction path 3d is formed so as to connect the fixing hole 3a with the pressure introduction port 3c. In other words, the pressure introduction path 3d is formed to be connected with a depth end of the fixing hole 3a. Specifically, the pressure introduction path 3d is formed so as to be connected with a substantially center of a depth end face of the fixing hole 3a. Further, the pressure introduction path 3d is formed in a round hole shape.

As shown in FIGS. 4(A) and 4(B), the fixing hole 3a is formed so as to be recessed obliquely downward (in an "X" direction) from the outer side face 3g. In this embodiment, the base end part of the bourdon tube 4 is inserted from an opening part 3e of the fixing hole 3a into the fixing hole 3a in the "X" direction. In other words, the "X" direction is an insertion direction of the bourdon tube 4 into the fixing hole 3a and the insertion direction "X" is inclined with respect to the "W" direction which is perpendicular to the outer side face 3g. Further, the opening part 3e of the fixing hole 3a is an insertion port of the bourdon tube 4. In this embodiment, the "W" direction is a first direction which is perpendicular to the outer side face 3g.

Further, in this embodiment, the base end part of the bourdon tube 4 is formed so as to be squeezed in the "Y" direction which is perpendicular to a direction perpendicular to the paper surface in FIGS. 4(A) and 4(B) and which is also perpendicular to the insertion direction "X". In other words, the base end part of the bourdon tube 4 is flattened in the "Y" direction and thus the "Y" direction is a flattened direction of the base end part of the bourdon tube 4.

Side faces 3j and 3k of the fixing hole 3a faced each other in the flattened direction "Y" are formed to be substantially parallel to each other. Further, the side faces 3j and 3k are formed in a flat-like face which is substantially parallel to the insertion direction "X". In this embodiment, the fixing hole 3a is formed in a substantially similar shape to a cross-sectional outward form of the bourdon tube 4 when viewed in the insertion direction "X". Specifically, the shape of the fixing hole 3a when viewed in the insertion direction "X" is set to be a flatted shape (in other words, a shape like a flattened athletic track) which is slightly larger than the cross-sectional outward form of the bourdon tube 4. The depth end face of the fixing hole 3a is formed in a flat-like face which is substantially perpendicular to the side faces 3j and 3k.

A recessed part 3m which is recessed in the flattened direction "Y" is formed on an inner face of the fixing hole 3a. Specifically, the recessed part 3m is formed on the side face 3j which is disposed on the upper side. As shown in FIG. 3(A), the recessed part 3m is formed at a substantially center position of the side face 3j in the lateral direction in FIG. 3(A). The recessed part 3m is formed toward a depth end side of the fixing hole 3a. Specifically, the recessed part 3m is formed in a substantially straight shape in the "W" direction. Further, the recessed part 3m is formed in a curved shape which is substantially circular arc shape viewed in the "W" direction and the recessed part 3m is formed by, for example, using a drill rotated with the "W" direction as an axial direction. In this embodiment, as shown in FIG. 3(A), the recessed part 3m is formed from the outer side face 3g in the "W" direction so that a circular arc part 3n protruding toward the upper side is formed on the opening part 3e (in other words, so that the circular arc part 3n is formed on the outer side face 3g). Further, the recessed part 3m is formed so that the depth end of the recessed part 3m is reached to a deeper position (right side in FIG. 4(A)) than the depth end of the fixing hole 3a.

As described above, the fixing hole 3a is formed so as to recess in the insertion direction "X" and the recessed part 3m is formed in the substantially straight shape in the "W" direction. Therefore, in this embodiment, a portion of the recessed part 3m which is formed on the inner side of the fixing hole 3a is gradually widened in the flattened direction "Y" toward the depth side of the fixing hole 3a. In other words, the portion of the recessed part 3m which is formed on the inner side of the fixing hole 3a is widened in comparison with the opening part 3e in the flattened direction "Y". In this embodiment, the portion of the recessed part 3m on the inner side of the fixing hole 3a is formed wider in the flattened direction "Y" than the portion where the circular arc part 3n of the opening part 3e is formed and which is the widest portion of the opening part 3e in the flattened direction "Y". In other words, when viewed in the insertion direction "X", a width "B" in the flattened direction "Y" of the portion of the recessed part 3m which is formed on the inner side of the fixing hole 3a is larger than a width "A" in the flattened direction "Y" of the portion of the opening part 3e where the circular arc part 3n is formed.

In this embodiment, the base end part of the bourdon tube 4 is inserted into the fixing hole 3a and the base end part of the bourdon tube 4 is adhesively fixed to the fixing hole 3a. The recessed part 3m is used as an adhesive pool part in which an adhesive is pooled for fixing the base end part of the bourdon tube 4 to the fixing hole 3a.

Principal Effects in this Embodiment

As discussed above, in this embodiment, the portion of the recessed part 3m which is formed on the inner side of the fixing hole 3a is formed so as to be widened in the flattened direction "Y" in comparison with the portion of the opening part 3e where the circular arc part 3n is formed. In other words, the portion of the recessed part 3m which is formed on the inner side of the fixing hole 3a is formed to be gradually wider in the flattened direction "Y" toward the depth side of the fixing hole 3a and the recessed part 3m is used as the adhesive pool part. Therefore, even when a pressure is generated in the inside of the bourdon tube 4 and a load is applied to the bourdon tube 4 in a detaching direction from the fixing hole 3a, the adhesive cured in the recessed part 3m is pressed against a bottom face (toward the upper side in FIG. 4(A)) of the recessed part 3m and is capable of being prevented from peeling off from the recessed part 3m. Accordingly, even when a load is occurred in the bourdon tube 4 in the detaching direction from the fixing hole 3a, the bourdon tube 4 is prevented from detaching from the fixing hole 3a as long as the adhesive is not peeled off from the surface of the bourdon tube 4. In other words, in this embodiment, the bourdon tube 4 made of metal can be prevented from detaching from the joint 3 which is made of resin.

Further, in this embodiment, the recessed part 3m which is formed toward the depth side of the fixing hole 3a is used as the adhesive pool part. Therefore, displacement of the bourdon tube 4 with respect to the fixing hole 3a is prevented in a direction perpendicular to the insertion direction "X" and the flattened direction "Y" (in a direction perpendicular to the paper surface in FIG. 4(A)).

In this embodiment, the side faces 3j and 3k of the fixing hole 3a faced each other in the flattened direction "Y" are formed to be substantially parallel to each other. Therefore, the fixing hole 3a is formed easily. Further, in this embodiment, the recessed part 3m is formed in a straight shape in the "W" direction and its shape viewed in the "W" direction is formed in a curved shape which is a substantially circular arc shape. Therefore, the recessed part 3m is capable of being easily formed by using a drill or the like which is rotated with the "W" direction as an axial direction.

Other Embodiments

In the embodiment described above, as shown in FIG. 4(A), the recessed part 3m is formed so that the depth end of the recessed part 3m is disposed deeper side than the depth end of the fixing hole 3a. However, the present invention is not limited to this embodiment. For example, as shown in FIG. 5(A), the recessed part 3m may be formed so that the depth end of the recessed part 3m is located on an outer face side (left side in FIG. 5(A)) in comparison with the depth end of the fixing hole 3a. Alternatively, the recessed part 3m may be formed so that the depth end of the recessed part 3m and the depth end of the fixing hole 3a are coincided with each other.

In the embodiment described above, the recessed part 3m is formed from the outer side face 3g in the "W" direction so that the circular arc part 3n is formed at the opening part 3e. However, the present invention is not limited to this embodiment. For example, as shown in FIG. 5(B), the recessed part 3m may be formed in a straight shape in the "W" direction from an intermediate position of the side face 3j in the insertion direction "X". In this case, the circular arc part 3n is not formed at the opening part 3e.

In the embodiment described above, the recessed part 3m is formed in a substantially straight shape in the "W" direction. However, the present invention is not limited to this embodiment. For example, as shown in FIG. 5(C), the recessed part 3m may be formed in the insertion direction "X" so as to be formed in a stepped shape having a stepped part 3p at an intermediate position. In this case, a part of the recessed part 3m which is formed on the inner side of the fixing hole 3a (specifically, on the deeper side than the stepped part 3p) is formed wider in the flattened direction "Y" than the portion where the circular arc part 3n of the opening part 3e is formed. In this case, when a load is occurred in the bourdon tube 4 in a direction detaching from the fixing hole 3a, the adhesive cured in the recessed part 3m is engaged with the stepped part 3p.

In the embodiment described above, the recessed part 3m is formed on the upper side face 3j of the fixing hole 3a. However, as shown in FIG. 5(D), the recessed part 3m may be formed on the lower side face 3k of the fixing hole 3a. In this case, for example, the recessed part 3m is formed in a substantially straight shape in a direction further inclined to the insertion direction "X" which is inclined with respect to the "W" direction. Further, the recessed part 3m may be formed on both of the side faces 3j and 3k. In other words, the recessed part 3m may be formed on at least one of the side faces 3j and 3k which are faced each other in the flattened direction "Y".

Figure 6:
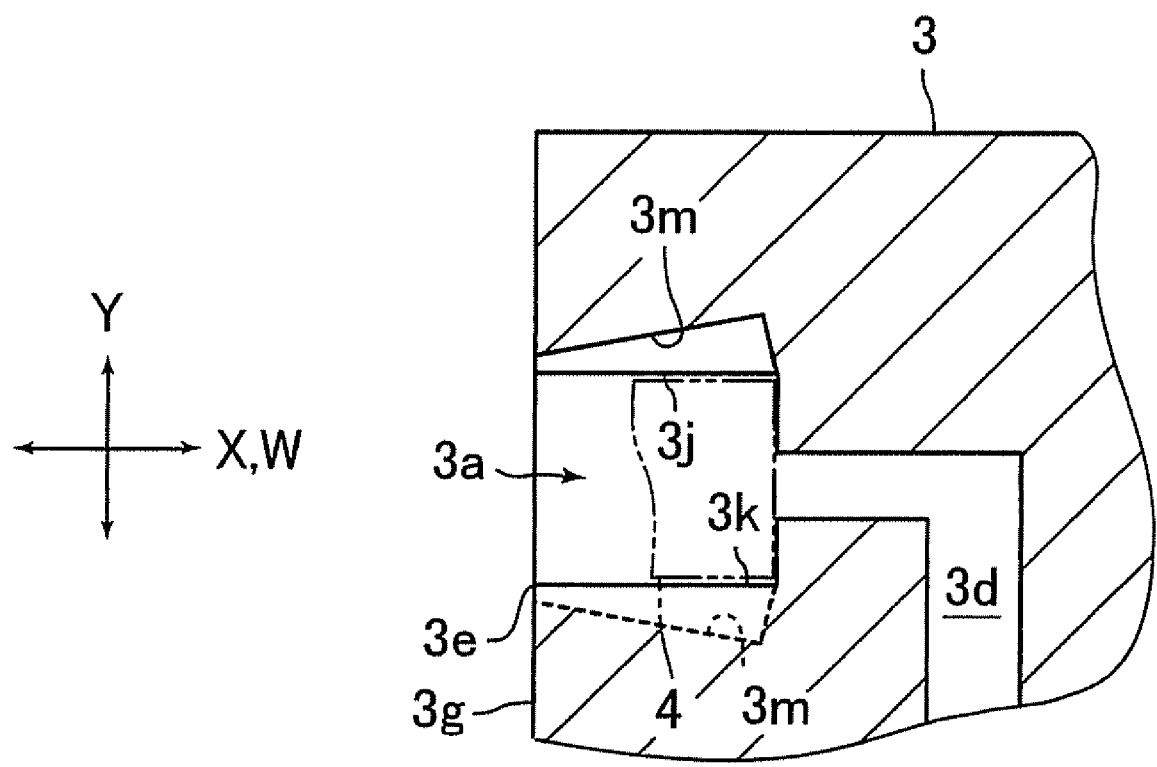
FIG. 6 is an explanatory cross-sectional view showing a structure of a joint in accordance with another embodiment of the present invention.

In the embodiment described above, the insertion direction "X" is inclined with respect to the "W" direction. However, as shown in FIG. 6, the insertion direction "X" and the "W" direction may be substantially coincided with each other. In other words, the side faces 3*j* and 3*k* may be formed in substantially parallel to the "W" direction. In this case, as shown by the solid line in FIG. 6, the recessed part 3*m* may be formed on the side face 3*j* or, as shown by the broken line in FIG. 6, the recessed part 3*m* may be formed on the side face 3*k*. Further, the recessed part 3*m* may be formed on both of the side faces 3*j* and 3*k*.

Figure 7:
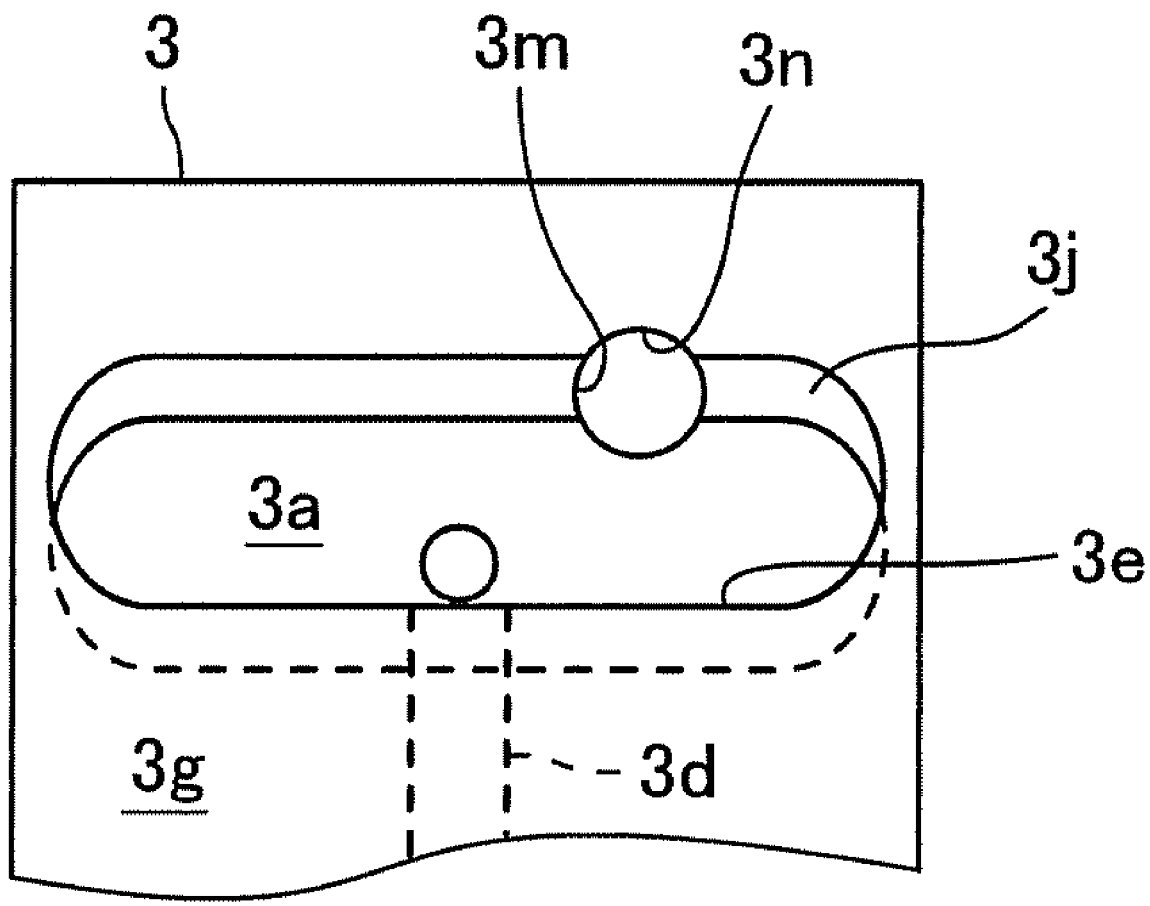
FIG. 7 is an explanatory view showing a structure of a joint in accordance with another embodiment of the present invention.

In the embodiment described above, the recessed part 3*m* is formed at a substantially center position of the side face 3*j* in the lateral direction in FIG. 3(A). However, the present invention is not limited to this embodiment. For example, as shown in FIG. 7, the recessed part 3*m* may be formed at a position displaced from the substantially center of the side face 3*j* in the lateral direction in FIG. 7. In other words, the recessed part 3*m* and the pressure introduction path 3*d* may be displaced in the lateral direction in FIG. 7 (direction perpendicular to the insertion direction "X" and the flattened direction "Y"). In this case, the adhesive pooled in the recessed part 3*m* is surely prevented from blocking the pressure introduction path 3*d*.

In the embodiment described above, one recessed part 3*m* is formed on the side face 3*j* but two or more recessed parts 3*m* may be formed on the side face 3*j*. Further, in the embodiment described above, the recessed part 3*m* is formed in a curved shape which is in a substantially circular arc shape when viewed in the "W" direction. However, the recessed part 3*m* may be formed in a substantially multi-angular groove shape such as a substantially rectangular groove shape when viewed in the "W".

Figure 8:
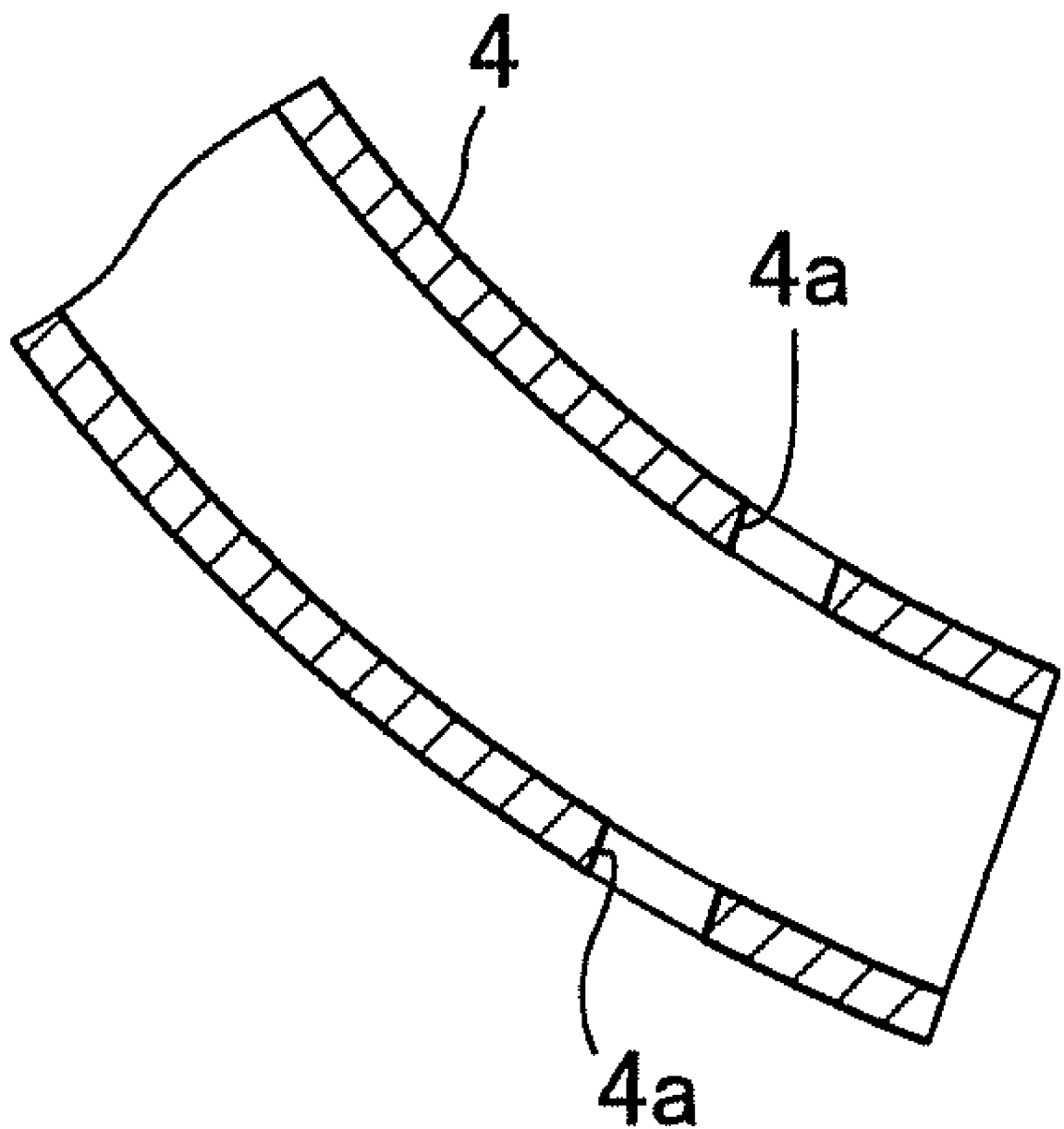
FIG. 8 is a cross-sectional view showing a base end part of a bourdon tube in accordance with another embodiment of the present invention.

Further, as shown in FIG. 8, through holes 4*a* may be formed in the base end part of the bourdon tube 4. In this case, an adhesive for fixing the base end part of the bourdon tube 4 to the fixing hole 3*a* is entered into the through holes 4*a* and thus fixing strength of the bourdon tube 4 to the joint 3 can be increased. Therefore, detachment of the bourdon tube 4 from the joint 3 is prevented effectively.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A bourdon tube pressure gauge comprising:
    a joint which is made of resin and which is attached to a pressure container; and
    a bourdon tube which is made of metal and provided with a base end part that is fixed to the joint;
    wherein the joint is formed with a fixing hole to which the base end part of the bourdon tube is inserted and adhesively fixed, a side face of the fixing hole is formed with a recessed part which is recessed in a flattened direction of the base end part of the bourdon tube that is inserted into the fixing hole, the recessed part is formed toward a depth side of the fixing hole, and at least a part of the recessed part which is formed on an inner side of the fixing hole is formed wider in the flattened direction than an opening part of the fixing hole which is an insertion port of the bourdon tube.

2. The bourdon tube pressure gauge according to claim 1, wherein the portion of the recessed part which is formed on the inner side of the fixing hole is formed to be gradually wider in the flattened direction toward the depth side of the fixing hole.

3. The bourdon tube pressure gauge according to claim 2, wherein
    an insertion direction of the bourdon tube to the fixing hole is inclined with respect to a first direction which is perpendicular to an outer side face of the joint where the opening part is formed, and
    the recessed part is formed in a substantially straight shape toward the first direction.

4. The bourdon tube pressure gauge according to claim 3, wherein the recessed part is formed in a curved shape which is a substantially circular arc shape when viewed in the first direction.

5. The bourdon tube pressure gauge according to claim 2, wherein
    the joint is formed with a pressure introduction path so as to be connected with a depth end of the fixing hole for guiding a fluid in the pressure container to the bourdon tube, and
    the recessed part and the pressure introduction path are displaced from each other in a direction perpendicular to the insertion direction of the bourdon tube into the fixing hole and the flattened direction.

6. The bourdon tube pressure gauge according to claim 1, wherein side faces of the fixing hole which are faced each other in the flattened direction are substantially parallel to each other.

7. The bourdon tube pressure gauge according to claim 2, wherein side faces of the fixing hole which are faced each other in the flattened direction are substantially parallel to each other.

8. The bourdon tube pressure gauge according to claim 1, wherein
    an insertion direction of the bourdon tube to the fixing hole is inclined with respect to a first direction which is perpendicular to an outer side face of the joint where the opening part is formed, and
    the recessed part is formed in a substantially straight shape toward the first direction.

9. The bourdon tube pressure gauge according to claim 8, wherein the recessed part is formed in a curved shape which is a substantially circular arc shape when viewed in the first direction.

10. The bourdon tube pressure gauge according to claim 1, wherein
    the joint is formed with a pressure introduction path so as to be connected with a depth end of the fixing hole for guiding a fluid in the pressure container to the bourdon tube, and
    the recessed part and the pressure introduction path are displaced from each other in a direction perpendicular to the insertion direction of the bourdon tube into the fixing hole and the flattened direction.

* * * * *